Sept. 14, 1954 R. B. LAWRANCE 2,689,347

TIMING APPARATUS

Filed April 25, 1946 5 Sheets-Sheet 1

ESSENTIAL COMPONENTS OF A LONG RANGE NAVIGATION SYSTEM.

INVENTOR
RICHARD B. LAWRANCE

BY M.C. Hayes

ATTORNEY

Sept. 14, 1954 R. B. LAWRANCE 2,689,347

TIMING APPARATUS

Filed April 25, 1946 5 Sheets-Sheet 2

CATHODE RAY TUBE PRESENTATION OF SLOW SWEEP WITH STATIONS SYNCHRONIZED IN PAIRS.

CATHODE RAY TUBE PRESENTATION AT MASTER STATION "X-Y"

CATHODE RAY TUBE PRESENTATION AT SLAVE STATION "W"

CATHODE RAY TUBE PRESENTATION AT SLAVE STATION "Y"

INVENTOR
RICHARD B. LAWRANCE

BY M. C. Hayes

ATTORNEY

PRESENT SCHEME OF TIMER SELECTOR AND TRACE SHIFT CIRCUITS.

INVENTOR
RICHARD B. LAWRANCE

BY *M. O. Hayes*
ATTORNEY

Sept. 14, 1954 R. B. LAWRANCE 2,689,347

TIMING APPARATUS

Filed April 25, 1946 5 Sheets-Sheet 4

INVENTED SYSTEM OF TIMER SELECTOR AND TRACE SHIFT CIRCUITS.

INVENTOR
RICHARD B. LAWRANCE

BY M. C. Hayes

ATTORNEY

Sept. 14, 1954 R. B. LAWRANCE 2,689,347

TIMING APPARATUS

Filed April 25, 1946 5 Sheets-Sheet 5

CATHODE RAY TUBE PRESENTATION AT SLAVE STATION "Y" AS IT BECOMES A MASTER STATION TO "W".

CATHODE RAY TUBE PRESENTATION AT SLAVE STATION "W" AS IT CHANGES ITS SYNCHRONISM FROM "X" TO "Y".

INVENTOR
RICHARD B. LAWRANCE

BY M. O. Hayes
ATTORNEY

Patented Sept. 14, 1954 2,689,347

UNITED STATES PATENT OFFICE 2,689,347

TIMING APPARATUS

Richard B. Lawrance, Cambridge, Mass., assignor by mesne assignments, to the United States of America as represented by the Secretary of the Navy Application April 25, 1946, Serial No. 664,771

11 Claims. (Cl. 343—103)

This invention relates to a position indicating system, and more particularly to timing apparatus for controlling the operation of synchronized ground transmitting stations.

A long range navigation system which enables a navigator to locate himself on the surface of the earth is disclosed and claimed in the copending application of Jabez C. Street, John A. Pierce, and Donald E. Kerr, Serial No. 599,163, filed June 13, 1945, on "Long Range Navigation System." Broadly, this system comprises a plurality of pairs of pulse transmitters spaced at known positions, each transmitter radiating pulses which bear a fixed time relationship with pulses radiated by the other transmitter comprising the pair. The navigator has apparatus which receives these pulses and indicates the difference in the propagation time of pulses from paired transmitters. With this information, and knowledge of the fixed time relationship between paired pulses, a location may be established along spherical hyperbolas having their foci at respective pairs of transmitters. The intersection of these hyperbolas will fix the position of the navigator. In practice, charts of the area served by the transmitters are prepared for the navigator's use. These charts have plotted thereon the family of spherical hyperbolas corresponding to each pair of transmitters, the hyperbolas plotted being chosen to correspond to some predetermined time difference. Using these charts, the navigator has only to measure the arrival time difference of the corresponding pulses from each pair of transmitters and then determine his position by interpolating the distance between the two hyperbolas nearest to the measured difference in arrival time.

As previously mentioned, the ground transmitting stations are synchronized in pairs to give hyperbolic lines of position. With this usual pair arrangement one station serves as master and the other as its slave, the slave being synchronized to its master. It is usual for the two stations of a pair to transmit signals recurring at a distinctive rate, so that one pair is distinguishable from another. Under some conditions of operation and terrain it is desirable to have the ground stations set up as a triplet in which all three stations operate at the same repetition rate. One station now serves as a double master, and each of the other two stations as its slave. If for any reason the double master ceases to transmit its signals, the other two stations will still be synchronized, one taking over the function of the master. Present apparatus is not, however, well adapted for rearranging the timing and indicating equipment for purposes of synchronizing the two former slaves with each other.

It is, therefore, the object of the present invention to provide improved timing apparatus for the ground transmitting stations used in the described long range navigation system.

Another object is to provide timing apparatus which will provide for changing the functioning of a ground transmitting station from slave to master operation, without loss of synchronism with a second station.

A further object is to provide apparatus which makes possible the reading of negative slave delays by the same technique as reading positive delays.

These and other objects will be more apparent upon consideration of the following specification, taken in connection with the accompanying drawings, forming a part thereof, in which.

Figure 4A:
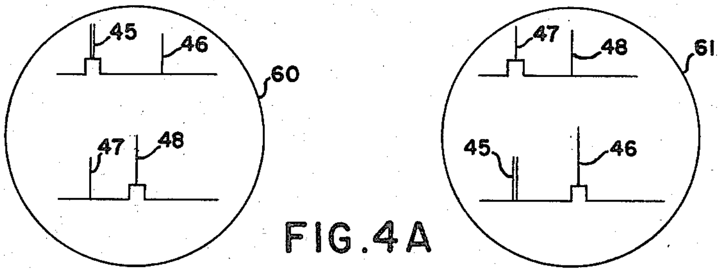
Figure 4B:
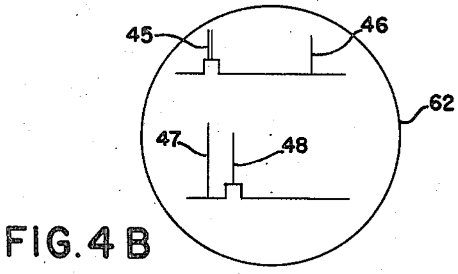
Figure 4C:
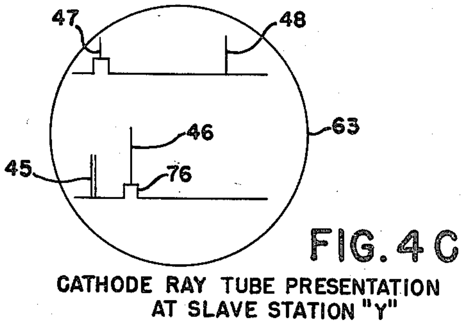
Figure 5:
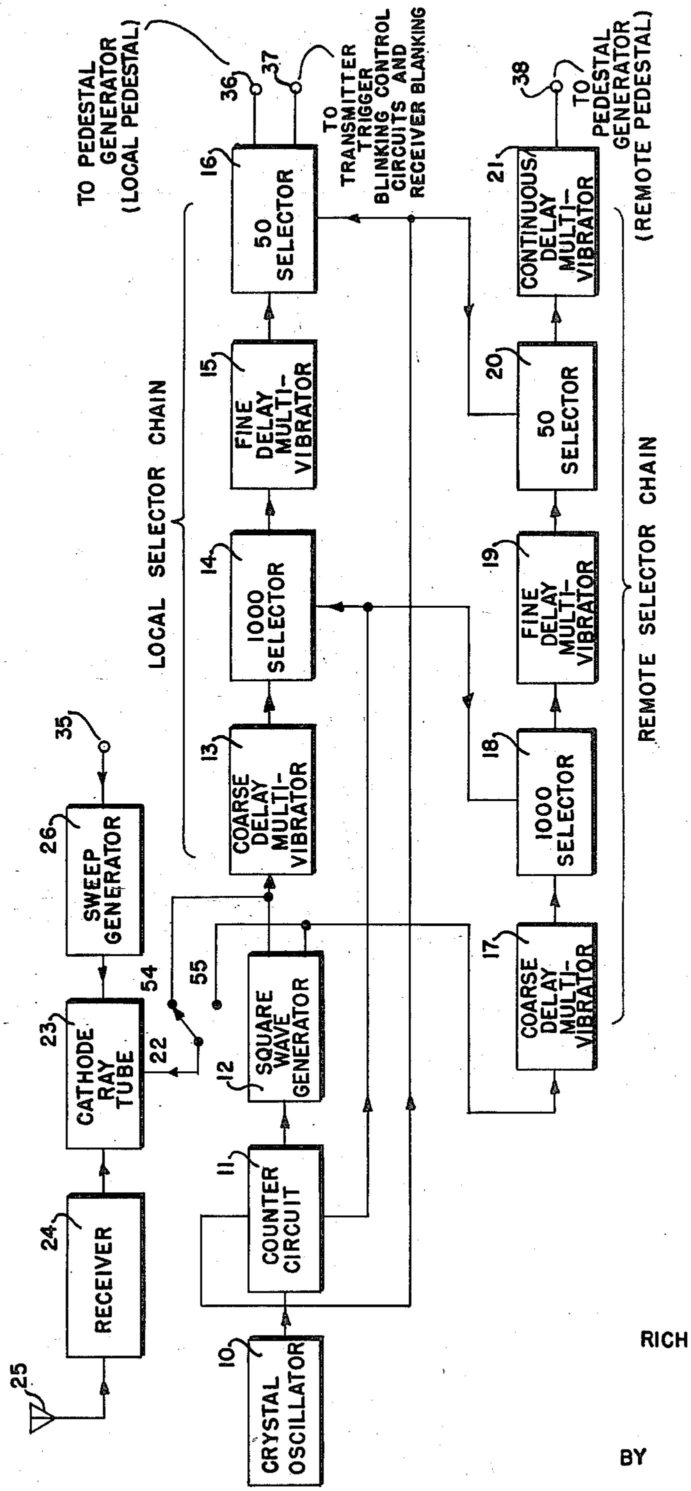
Figure 6A:
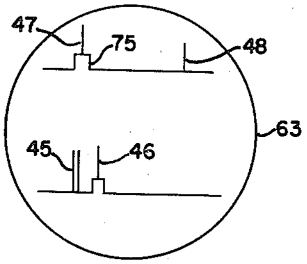
Figure 6B:
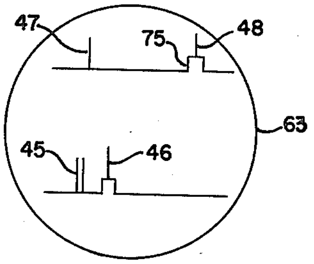
Figure 6C:
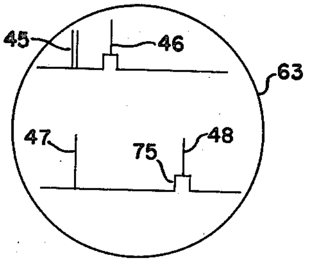
Figure 7A:
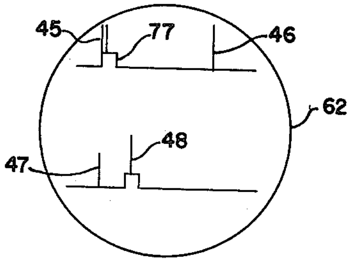
Figure 7B:
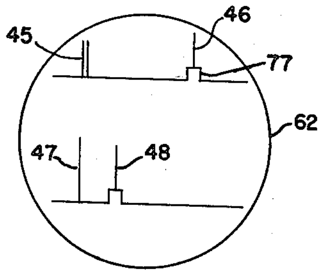
Figure 7C:
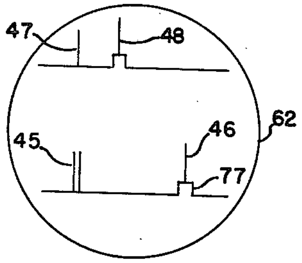

Figs. 4A, 4B, and 4C show the cathode ray tube presentation of each station of the triplet;

Fig. 5 is a block diagram representation of the invented system of timer selector and trace shift circuits;

Figs. 6A, 6B, and 6C shows the steps as observed in the cathode ray tube presentation at slave station "Y" as it becomes a master station to "W"; and Figs. 7A, 7B, and 7C show the steps as observed in the cathode ray tube presentation at slave station "W" as it changes its synchronism from "X" to "Y."

Figure 1A:
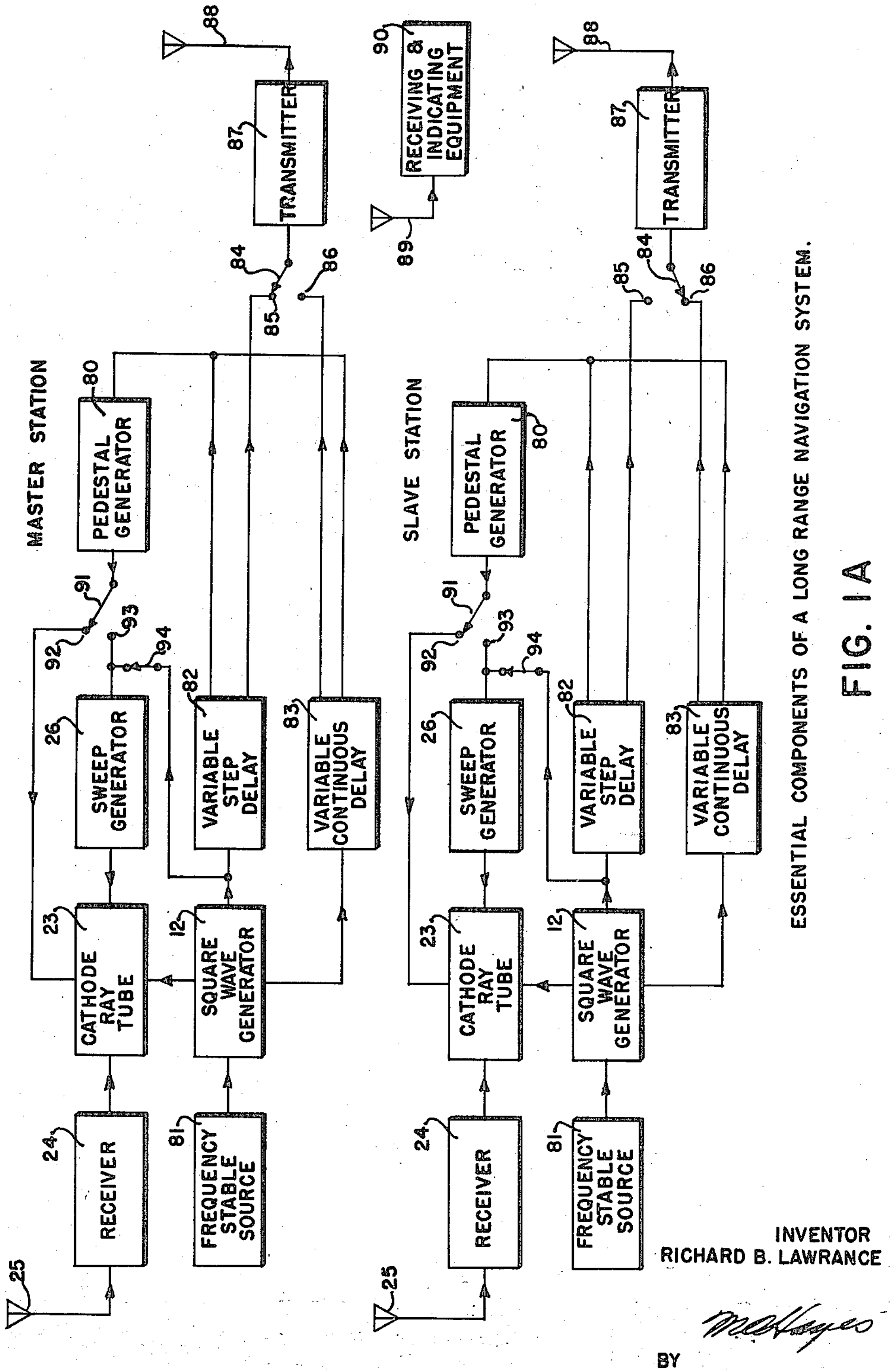
Fig. 1A shows in block diagram form the essential components of the long range navigation system.

In Fig. 1A are represented the components essential for complete operation of the system. A frequency stable source 81 synchronizes square wave generator 12. Variable step delay 82 is started by the output of one side of generator 12, and variable continuous delay 83 by the output of the other side, the delays being started 180° out of phase. Pedestal generator 80 is fired at the end of each delay interval, the pedestal being either applied directly to cathode ray tube 23 through switch 91 making contact with terminal 92, or said pedestal activating the sweep generator 26 in the case of the fast sweeps, switch 91 then contacting terminal 93. When the pedestal is applied directly to cathode ray tube 23, the sweep generator is activated by the square wave from generator 12, switch 94 then being closed. Alternate sweeps are displaced vertically by applying the output of square wave generator 12 to the deflection plates of cathode ray tube 23. If the station is a master station, switch 84 is closed to terminal 85, and transmitter 87 is fired after the step delay interval, radio frequency pulses being emitted from antenna 88. If the station is a slave, switch 84 is closed to terminal 86, and the transmitter is fired after the continuous delay interval. The pulse from the other station of the pair is received at antenna 25, amplified in receiver 24 and applied to cathode ray tube 23, where the timing between the pulses from the two stations comprising the pair is monitored. The navigator receives pulses from the pair of transmitters at antenna 89, and with receiving and indicating equipment 90 measures the difference in arrival time of the pulses and thereby determines his position.

Figure 1B:
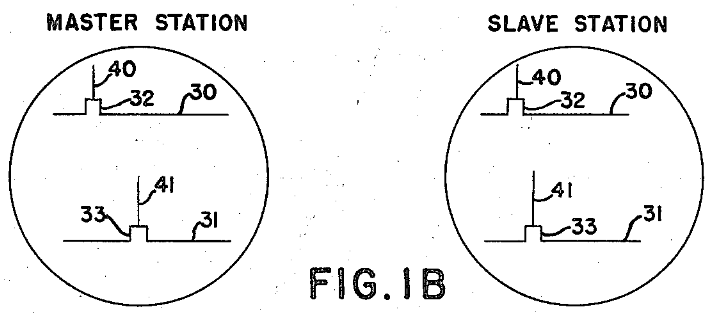
Fig. 1B shows the cathode ray tube presentation of the slow sweep with the transmitting stations synchronized in pairs.

The function of ground station timing equipment is to trigger the local transmitter at precisely controlled intervals and to monitor the elapsed time between the reception of a pulse from the remote station and the transmission of the local pulse. In present equipment a two-trace cathode ray tube presentation is used, with one pulse displayed on each trace. As shown in Fig. 1B for both the master and the slave station, it is conventional to call the upper trace 30 the "A" trace and always to have the master pulse 40 appear there, and to call the lower trace 31 the "B" trace, and have it carry the slave pulse 41.

Figure 2:
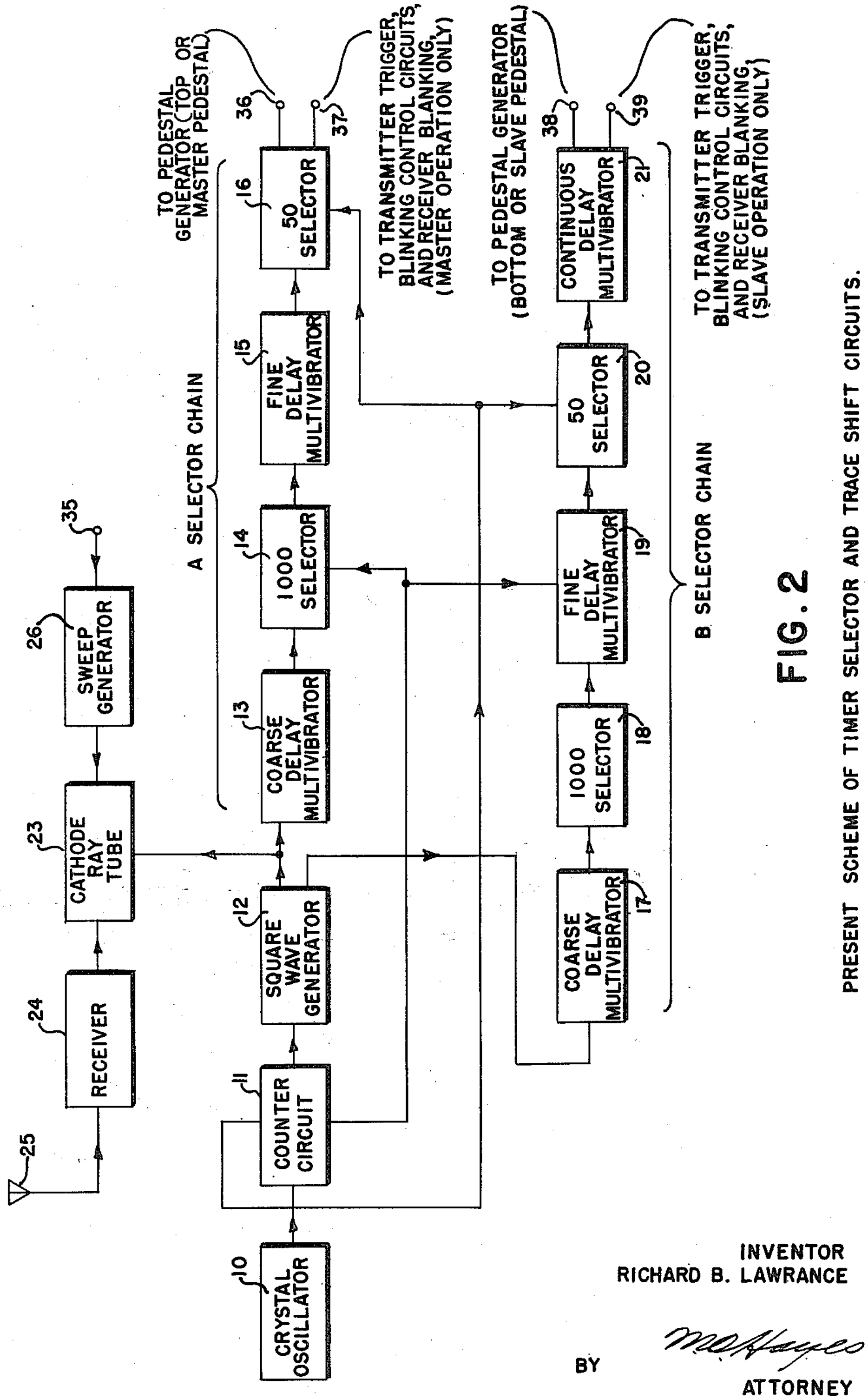
Fig. 2 is a block diagram representation of the present system of timer selector and trace shift circuits.

In order to obtain the necessary timing accuracy, small pedestals 32 and 33 are positioned respectively under the master and slave pulses by the operator, and the regions of these two pedestals are expanded in a two-trace fast sweep. The pedestals are at present individually controllable in delay from the start of their respective slow sweeps with a circuit whose block diagram is shown in Fig. 2, the details of which will be described at a later point in the specification. It should be noted that the "A selector chain" always positions the top (A or master pulse) pedestal on the scope, whereas the "B selector chain" is always associated with the bottom (B or slave pulse) pedestal, and that the transmitter trigger, blinking control circuits, and receiver blanking circuits are connected to the "A selector chain" if the timer is to be used as a master and to the "B selector chain" if it is to be used as a slave.

Figure 3:
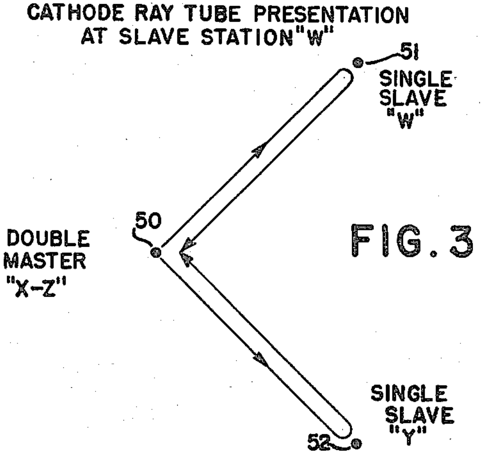
Fig. 3 shows the lay out for the operation of a triplet of ground stations.

Fig. 3 shows the location of three stations comprising a synchronized triplet. The master station 50, herein termed "X—Z," emits two signals which may be identified as the "X" and "Z" pulses. The "X" pulse is provided with an identifying means, such as blinking, which makes it distinguishable from the "Z" pulse. The slave stations 51 and 52 and their respective pulses are identified as "W" and "Y" respectively. Figs. 4A, 4B, and 4C show the scope pictures which are observed at each of the three stations. Pulse 45, originating at station "X—Z" as the "X" pulse, appears as a double pulse on the cathode ray tube because the aforementioned identifying means consists of "blinking" this pulse back and forth with respect to time. For example, every third "X" pulse from the "X—Z" station may be delayed from its normal position in the cycle by some predetermined amount, thereby appearing to the right of the true "X" pulse from which time measurements are made. Fig. 4A shows the presentation on the twin scopes at the master station "X—Z." Scope 60 monitors the synchronization between pulses "X" and "W" (45 and 48 respectively). Scope 61 monitors the synchronization between pulses "Z" and "Y" (47 and 46 respectively), the pulses monitored being positioned on the master and slave pedestals respectively as shown. Fig. 4B shows the presentation on scope 62 at slave stations "W," with the synchronization between the "X" "W" (45 and 48 respectively) pulses being monitored. Fig. 4C shows the presentation on scope 63 at slave station "Y," with the synchronization between the "Z" and "Y" pulses (47 and 46 respectively) being monitored.

Assume the following representative values for the time intervals involved:

1. Interval between transmission of "X" and "Z" pulses from station "X—Z": 20,000 microseconds.

2. Time of travel between station "X—Z" and "W": 3,470 microseconds.

3. Delay introduced at "W," between reception of "X" pulse and transmission of "W" pulse: 2,000 plus 20,000 microseconds.

4. Time of travel between station "X—Z" and station "Y": 3,720 microseconds.

5. Delay introduced at "Y," between reception of "Z" pulse and transmission of "Y" pulse: 2,000 plus 20,000 microseconds.

6. Time of travel between station "W" and station "Y": 6,615 microseconds.

Using these values, the sequence of events will be as follows:

| Time (microseconds) | Event |
|---|---|
| 0 | "X—Z" transmits "X" pulse. |
| 3,470 | "W" receives "X" pulse, starts delay of 22,000 microseconds. |
| 3,720 | "Y" receives "X" pulse, makes no response. |
| 5,720 | "Y" transmits "Y" pulse in response to previous "Z" pulse transmitted at time−20,000 microseconds and received at time−16,280 microseconds. |
| 9.440 | "X—Z" receives "Y" pulse. |
| 12,335 | "W" receives "Y" pulse. |
| 20,000 | "X—Z" transmits "Z" pulse. |
| 23,470 | "W" receives "Z" pulse, makes no response. |
| 23,720 | "Y" receives "Z" pulse, starts delay of 22,000 microseconds. |
| 25,470 | "W" transmits "W" pulse in response to previous "X" pulse transmitted at time 0 and received at time 3,470 microseconds. |
| 28,940 | "X—Z" receives "W" pulse. |
| 32,085 | "Y" receives "W" pulse. |
| 40,000 | "X—Z" transmits "X" pulse and sequence repeats. |
| 43,470 | "W" receives "X" pulse, starts delay of 22,000 microseconds. |
| 43,720 | "Y" receives "X" pulse, makes no response. |
| 45,720 | "Y" transmits "Y" pulse in response to "Z" pulse transmitted at time 20,000 microseconds and received at time 23,720 microseconds. |
| 49,440 | "X—Z" receives "Y" pulse. |
| 52,335 | "W" receives "Y" pulse. |

The indicators are adapted to reading delays when the pulse and pedestal on the upper "A" trace are to the left of those on the lower "B" trace, such delays being called positive. Subtracting 20,000 microseconds, which the nature of the indication does automatically, the delays measured at the three stations will be as follows:

At "X—Z"—

Delay of "W" pulse received behind "X" pulse: 28,940−20,000=8,940 microseconds (monitored continuously).

Delay of "Y" pulse received behind "Z" pulse: 49,440−20,000−20,000=9,440 (monitored continuously).

At "W"—

Delay of "W" pulse transmitted after reception of "X" pulse: 25,470−3,470−20,000=2,000 microseconds (monitored continuously).

Delay of "W" pulse transmitted after reception of "Y" pulse: 25,470—12,335—20,000=−6,865 microseconds.

At "Y"—

Delay of "Y" pulse transmitted after reception of "Z" pulse: 45,720—23,720—20,000=2000 microseconds (monitored continuously).

Delay of "Y" pulse transmitted after reception of "W" pulse: 45,720—32,085—20,000=—6,365 microseconds.

Under the above setup, both stations "W" and "Y" act as slaves to station "X—Z," each holding an indicated delay of 2,000 microseconds positive. When "X—Z" goes off the air, however, "Y" is required to become a master and "W" its slave. Under the existing system of Fig. 2, this changeover of functions requires the following operations:

At "Y," changing from slave (+2000 microseconds) to master (—6,365 microseconds).

1. Change transmitter trigger connection from "B selector chain" to "A selector chain."
2. Change receiver blanking circuits from "B selector chain" to "A selector chain."
3. Change blinker control circuits from "B selector chain" to "A selector chain."
4. Reset all selector multivibrators including the continuous delay, to obtain new reading.
5. Re-establish synchronization with "W."

At "W," changing from slave (+2000 microseconds) to slave (—6,865 microseconds).

1. Reset all selector multivibrators including the continuous delay, to obtain new reading.
2. Either read delays backward or change to master as in 1, 2, and 3 for "Y."
3. Re-establish synchronization with "Y."

The following points in the existing system are undesirable:

1. Although a perfectly good synchronization condition existed in the "W"—"Y" pair prior to the exit of "X—Z," this synchronization is lost during the changeover at each station.
2. In slave operation the transmitter trigger is taken from the "B selector chain," whereupon any jitter in the continuous delay multivibrator, which is the only multivibrator in either selector chain which is not locked in to the crystal, will appear at the trigger.
3. In changing the delay reading, in cases where the transmitter trigger is taken from the "B selector chain," the absolute timing of the transmitted pulse (as observed by someone outside the station) is changed.
4. It is not possible to read negative delays by the conventional technique for reading positive delays.
5. In cases where synchronization over a long baseline is established by an intermediate station (so-called "relay sync"), when the intermediate station stops transmitting the two extreme stations cannot transfer their synchronization to each other without interrupting service.
6. Making the changeover from master to slave, or vice versa, necessitates a number of wiring changes, as outlined above.

The present invention consists of a functional regrouping of the existing timer circuits, with the addition of a switching circuit for reversing the polarity of the trace separation voltage. Comparing Fig. 5 with Fig. 2, it will be noted that the invented timer differs radically in function from existing timers in the following important respects. The former "A selector chain" is now renamed the "local selector chain" and the signal displayed on its pedestal will always be the local pulse. The "B selector chain" is renamed the "remote selector chain" and the signal displayed on its pedestal will always be a remote pulse. The local selector chain is now permanently connected to the transmitter trigger, blinking control, and receiver blanking circuits. Trace-transposing switch 22 provides for reversing the relative positions of the upper and lower trace.

The following specific description can be applied to the timer selector and trace shift circuits shown in block diagram form in both Figs. 2 and 5. The output of crystal oscillator 10 is stepped down in frequency by counter circuit 11, the resulting output being used to synchronize square wave generator 12. The output from one side of square wave generator 12 is used to start coarse delay multivibrator 13, whose delay is continuously adjustable from a few hundred microseconds to approximately 15,000 microseconds. At the end of this delay period a gate slightly less than 1,000 microseconds long is generated and allowed to pass one of the 1,000 microsecond pips from the counter chain, this circuit being herein termed 1000 selector 14. The selected pip starts fine delay multivibrator 15, which, with 50 selector 16, functions in a similar manner to select a 50 microsecond pip from the counter chain. The net result is a delay which is the sum of two delays—one of which is a multiple of 1,000 microseconds and the other a multiple of 50 microseconds.

The output from the other side of square wave generator 12 is used to start coarse delay multivibrator 17, which, with 1000 selector 18, fine delay multivibrator 19, and 50 selector 20, operates in a manner similar to the selector chain described above. The selected 50 microsecond pip starts continuous delay multivibrator 21, which provides a delay gate which is variable in width between predetermined limits, for example 10 to 70 microseconds. The net result of this selector chain is a delay which is the sum of three delays, two of which are synchronized with the crystal oscillator and the third of which is a continuously controllable delay. Signals picked up by antenna 25 are amplified at receiver 24 and applied to the vertical deflection plate of cathode ray tube 23. A linear sweep is applied to the horizontal deflection plates by sweep generator 26, which may be synchronized by an input voltage at terminal 35.

In the timer represented in Fig. 2 a square wave of voltage is taken off one side of square wave generator 12 and applied to cathode ray tube 23 for effecting the vertical separation between the upper and lower traces appearing on the scope. A timing signal which fires a pedestal generator in the indicator is taken off terminal 36, the pedestal so produced always appearing on the top trace and carrying the pulse from the master station. A similar timing signal for firing the pedestal generator in the indicator is taken off terminal 38, the pedestal so produced always appearing on the bottom trace and carrying the slave pulse. Timing signals for triggering the transmitter, the blinker control circuits, and the receiver blanking circuits are taken off terminal 37 if the timer is used at a master station and off terminal 39 if it is used as a slave timer. The above connections are normally made by links on a terminal board, and are semi-permanent connections.

In the present invention, as represented in Fig. 5, the square wave voltage for effecting the vertical separation of the traces on cathode ray tube 23 may be taken off either side of square wave generator 12 depending on the position of trace-transposing switch 22. Switching the contact arm of switch 22, for example from terminal 54 to 55, will reverse the position of the upper and lower traces. A timing signal for firing the pedestal generator in the indicator to produce the local pedestal is taken off terminal 36, and the timing signal to produce the remote pedestal is taken off terminal 38. The timing signals for triggering the transmitter, the blinker control circuits, and the receiver blanking circuits are taken off terminal 37 whether the timer is to be used as a master or a slave.

Referring to Fig. 6A, the cathode ray tube presentation is the same as shown in Fig. 4C, showing the local "Y" pulse 46 being monitored in synchronism with the remote "Z" pulse 47. The functional difference, however, is that in Fig. 6A it is the top remote pedestal 75 which is continuously variable in position, whereas in Fig. 4C it was the bottom pedestal 76 which was continuously variable. It is also to be noted that the top trace is carrying the remote pedestal 75. In changing the synchronization setup so that "Y" becomes master to "W," the first step, as shown in Fig. 6B, consists of moving the remote pedestal 75 so that the "W" pulse 48 is positioned on it, the monitored delay being changed from +2000 microseconds to −6,365 microseconds. Next, as shown in Fig. 6C, the trace-transposing switch 22 is changed in position, effecting a reversal in the relative vertical positions of the two traces. The conventional reading technique, as previously mentioned, can now be employed, the pulse and pedestal on the upper trace being to the left of the pulse and pedestal on the lower trace. The timer is now set up to monitor the new delay.

Referring to Fig. 7A, the cathode ray tube presentation is the same as shown in Fig. 4B, showing the "X" pulse 45 being monitored in synchronism with the "W" pulse 48. It is to be noted that the remote pedestal 77 is the one which is continuously variable in position, and appears on the upper trace. In changing the synchronization setup so that "W" becomes slave to "Y," instead of to "X—Z," the first step, as shown in Fig. 7B consists of moving the remote pedestal 77 so that the "Y" pulse 46 is mounted on it, the monitored delay being changed from +2000 microseconds to −6865 microseconds. Next, as shown in Fig. 7C, the trace-transposing switch 22 is changed in position, effecting a reversal of the relative vertical positions of the two traces. The timer is now set up to monitor the new delay.

The present invention effects the following important advantages over the functioning of existing timers:

1. The transmitter trigger is always taken from the local selector chain, which has no continuous delay multivibrator, regardless of whether the timing is for master or slave operation, so there is no possibility of a "continuous delay multivibrator" jitter in slave stations, as was possible under the timing setup as represented in Fig. 2.

2. It is now possible to make any delay reading (not necessarily a multiple of 50 microseconds) and to change this delay reading to any other reading without changing the absolute timing of the transmitted pulse (as observed by someone outside the station).

3. It makes possible the reading of negative slave delays by the conventional technique for reading positive delays.

4. It makes possible "relay synchronization," wherein synchronization over a long baseline is established by an intermediate station to which both extreme stations are synchronized. If the intermediate station stops transmitting, one of the extreme stations can assume the role of master and synchronization can be maintained without interrupting service.

5. It makes possible the changeover from master to slave with one switch, in a way which affects only the indicator circuits.

The many advantages accruing from the present invention will greatly add to the flexibility of such long range navigation systems, and associated and similar apparatus. Although the invention has been disclosed in a particular embodiment it will be obvious to one skilled in the art that many changes may be made without departing from the spirit of the invention, as sought to be defined in the following claims.

What is claimed is:

1. A long range navigation system including, a plurality of pairs of pulsed transmitters, receiving and indicating equipment, and timing apparatus at each of said transmitters for synchronizing the pulsing of transmitters comprising each pair, said timing apparatus comprising a square wave generator, means for generating a variable step delay, means for generating a variable continuous delay, means for pulsing said transmitter after said step delay, and means connecting the output of said square wave generator to said receiving and indicating equipment, said means being adapted to reverse the phase of said connected square wave.

2. A long range navigation system including, transmitting means, receiving means and indicating means, said indicating means comprising, a cathode ray tube, and sweep generating means, said transmitting means including timing means, said timing means comprising, a square wave generator, means for generating a delay which is variable in steps, means for generating a delay which is continuously variable, means for firing said transmitting means at a time determined by said step delay, the output of said step delay and said continuous delay being applied to said indicating means, whereby said cathode ray tube is energized, switching means, means for applying the output of said square wave generator to said cathode ray tube through said switching means such that alternate sweeps are displaced vertically, said switching means providing for reversal of the relative vertical positions of alternate sweeps.

3. Timing apparatus comprising, a frequency stable oscillator, a frequency divider circuit connected to the output of said oscillator, a square wave generator synchronized from the output of said frequency divider, a first coarse delay multivibrator started by the output of said square wave generator, means for synchronizing said first coarse delay multivibrator to said oscillator, a first fine delay multivibrator started by said first coarse delay multivibrator, means for synchronizing said first fine delay multivibrator to said oscillator, whereby the resulting delay is the sum of the delays from said first coarse delay multivibrator and said first fine delay multivibrator and the output of said fine delay multivibrator provides a first timing signal, a second coarse delay multivibrator started 180° out of phase with said first coarse delay multivibrator, means for synchronizing said second coarse delay multivibrator to said oscillator, a second fine delay multivibrator started by said second coarse delay multivibrator, means for synchronizing said second fine delay multivibrator to said oscillator, a continuous delay multivibrator started by said second fine delay multivibrator, whereby the resulting delay is the sum of the delays from said second coarse delay multivibrator and said second fine delay multivibrator and said continuous delay multivibrator and the output of said continuous delay multivibrator provides a second timing signal, a cathode ray tube energized by said timing signals, a sweep generator connected to said cathode ray tube, switching means connecting the output of said square wave generator to said cathode ray tube whereby alternate sweeps are displaced vertically, said switching means providing for reversing the relative vertical positions of the sweeps.

4. A long range navigation system including transmitting means, receiving means and indicating means, said indicating means including, a cathode ray tube, a pedestal generator, and a sweep generator which applies a horizontal deflecting voltage to said cathode ray tube, said transmitting means including timing apparatus for generating triggers for firing said transmitting means and for firing said pedestal generator, said timing apparatus comprising, a frequency stable oscillator, a frequency divider circuit connected to the output of said oscillator, a square wave generator synchronized from the output of said frequency divider, a first coarse delay multivibrator started by the output of said square wave generator, means for synchronizing said first coarse delay multivibrator to said oscillator, a first fine delay multivibrator started by said first coarse delay multivibrator, means for synchronizing said first fine delay multivibrator to said oscillator, whereby the resulting delay is the sum of the delays from said first coarse delay multivibrator and said first fine delay multivibrator, the output of said fine delay multivibrator providing a trigger for firing said transmitting means and said pedestal generator, a second coarse delay multivibrator synchronized with said square wave generator but started one-half cycle later than said first coarse delay multibivrator, means for synchronizing said second coarse delay multivibrator to said oscillator, a second fine delay multivibrator started by said second coarse delay multivibrator, means for synchronizing said second fine delay multivibrator to said oscillator, a continuous delay multivibrator started by said second fine delay multivibrator, whereby the resulting delay is the sum of the delays from said second coarse delay multivibrator and said second fine delay multivibrator and said continuous delay multivibrator, the output of said continuous delay multivibrator providing a trigger for firing said pedestal generator, switching means, means connecting the output of said square wave generator through said switching means to said cathode ray tube so as to vertically displace alternate sweeps, said switching means providing for reversing the relative vertical position of alternate sweeps.

5. In a long range navigation system, in combination, a plurality of pulsed synchronized transmitters, a like plurality of receivers, each of said transmitters having one of said receivers associated therewith, a first of said transmitters providing a reference timing pulse to the others of said transmitters through said receivers associated therewith, means for causing a second of said transmitters to provide a reference timing pulse to the others of said transmitters upon disablement of said first transmitter without loss of synchronism, and means in circuit with said receivers for substituting said reference timing pulse from said second transmitter in substantially the same position as said reference pulse from said first transmitter.

6. In a long range navigation system, in combination, a plurality of pulsed synchronized transmitters, a like plurality of receivers, a like plurality of timing devices, each of said transmitters having a receiver and a timing device associated therewith, each of said timing devices determining the time of operation of each of said transmitters associated therewith, a first of said transmitters providing a reference timing pulse to the others of said transmitters, and means for causing a second of said transmitters to provide a reference timing pulse to the others of said transmitters upon disablement of said first transmitter without loss of synchronism, said timing devices including means for presenting said reference timing pulse from said second transmitter in a manner similar to that of said reference timing pulse from said first transmitter.

7. In a long range navigation system comprising three transmitters linked for synchronous operation, means for causing the first of said transmitters to provide a reference timing pulse for synchronous operation to the second and third of said three transmitters, means for causing the second of said transmitters to provide a reference timing pulse to the third of said transmitters upon disablement of said first of said transmitters, said second transmitter maintaining said synchronous operation of said transmitters without interruption, and means in circuit with said timing devices for directly substituting said reference timing pulse from said second transmitter for said reference timing pulse from said first transmitter.

8. A long range navigation system comprising, a plurality of transmitters, receiving and timing devices associated with each of said transmitters for synchronizing operation thereof, each of said timing devices including means for substituting one of said transmitters for a second of said transmitters as the effective synchronization controlling transmitter.

9. A long range navigation system comprising, a plurality of synchronized transmitters, a first of said transmitters being the synchronization controlling transmitter, receiving, indicating, and timing devices associated with each of said transmitters, said indicating devices being adapted to present indications received by said synchronization controlling apparatus, said timing devices including means for directly substituting another of said transmitters for said first transmitter for presentation by said indicating device.

10. Apparatus as in claim 9, wherein said timing device includes means for selectively delaying signals applied thereto from said receiving device.

11. Apparatus as in claim 9, wherein said tuning device includes switching means and said indicating device includes means for providing alternate cathode ray sweeps displaced vertically in accordance with the disposition of said switching means.

References Cited in the file of this patent

UNITED STATES PATENTS

| Number | Name | Date |
|---|---|---|
| 2,403,600 | Holmes et al. | July 9, 1946 |
| 2,403,626 | Wolff et al. | July 9, 1946 |

FOREIGN PATENTS

| Number | Country | Date |
|---|---|---|
| 866,695 | France | May 31, 1941 |